(12) United States Patent
Aceron et al.

(10) Patent No.: US 12,494,931 B2
(45) Date of Patent: Dec. 9, 2025

(54) SYSTEMS AND METHODS FOR DYNAMIC AUDIOVISUAL CONFERENCING IN VARYING NETWORK CONDITIONS

(71) Applicant: Verizon Patent and Licensing Inc., Basking Ridge, NJ (US)

(72) Inventors: John Aceron, Chantilly, VA (US); Rohit Shirish Saraf, Nashua, NH (US); Andrew Philip Genualdi, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 294 days.

(21) Appl. No.: 18/333,593

(22) Filed: Jun. 13, 2023

(65) Prior Publication Data

US 2023/0318864 A1 Oct. 5, 2023

Related U.S. Application Data

(63) Continuation of application No. 17/378,984, filed on Jul. 19, 2021, now Pat. No. 11,716,214.

(51) Int. Cl.
*H04L 12/18* (2006.01)
*H04M 3/56* (2006.01)

(52) U.S. Cl.
CPC ...... *H04L 12/1827* (2013.01); *H04L 12/1831* (2013.01); *H04M 3/567* (2013.01); *H04M 3/568* (2013.01)

(58) Field of Classification Search
CPC ............ H04L 12/1827; H04L 12/1831; H04M 3/567; H04M 3/568
See application file for complete search history.

(56) References Cited

U.S. PATENT DOCUMENTS

| | | | |
|---|---|---|---|
| 6,370,597 B1 | 4/2002 | Eady et al. | |
| 2008/0263010 A1 | 10/2008 | Roychoudhuri et al. | |
| 2010/0253689 A1 | 10/2010 | Dinicola et al. | |
| 2015/0023169 A1 | 1/2015 | Wu et al. | |
| 2016/0088054 A1 | 3/2016 | Hassan et al. | |
| 2019/0045409 A1 | 2/2019 | Rasanen et al. | |
| 2019/0342507 A1 | 11/2019 | Dye et al. | |
| 2020/0059275 A1 | 2/2020 | Kato et al. | |
| 2020/0186894 A1* | 6/2020 | Thorwirth | G06T 1/0085 |

* cited by examiner

*Primary Examiner* — Raqiul A Choudhury

(57) ABSTRACT

Embodiments described herein provide for the dynamic adjustment of traffic associated with audiovisual conferences or other types of communication sessions in situations where a network connection of one or more conference participants exhibits issues that may affect audio and/or video quality. The adjustment may include the determination at a particular conference participant (e.g., a particular User Equipment ("UE")) of degraded network conditions, the generation of condensed conference information at the UE, and the outputting of the condensed conference information via the network. The condensed conference information may be included in control signaling. The condensed conference information may be used to generate reconstructed conference information, which may be distributed to other conference participants.

20 Claims, 8 Drawing Sheets

SYSTEMS AND METHODS FOR DYNAMIC AUDIOVISUAL CONFERENCING IN VARYING NETWORK CONDITIONS

CROSS-REFERENCE TO RELATED APPLICATION

This application is a Continuation of U.S. patent application No. Ser. No. 17/378,984, filed on Jul. 19, 2021, titled "SYSTEMS AND METHODS FOR. DYNAMIC AUDIOVISUAL CONFERENCING IN VARYING NETWORK CONDITIONS," the contents of which are herein incorporated by reference in their entirety.

BACKGROUND

Wireless user equipment ("UE"), such as mobile telephones or other wireless communication devices, may participate in voice calls, audiovisual conferences, or the like via one or more networks, such as a Local Area Network ("LAN"), the Internet, or other networks. Communications via such networks may experience issues, such as increased latency, increased jitter, reduced throughput, or the like, which may affect audio or video quality.

DETAILED DESCRIPTION OF EXAMPLE EMBODIMENTS

Figure 1:
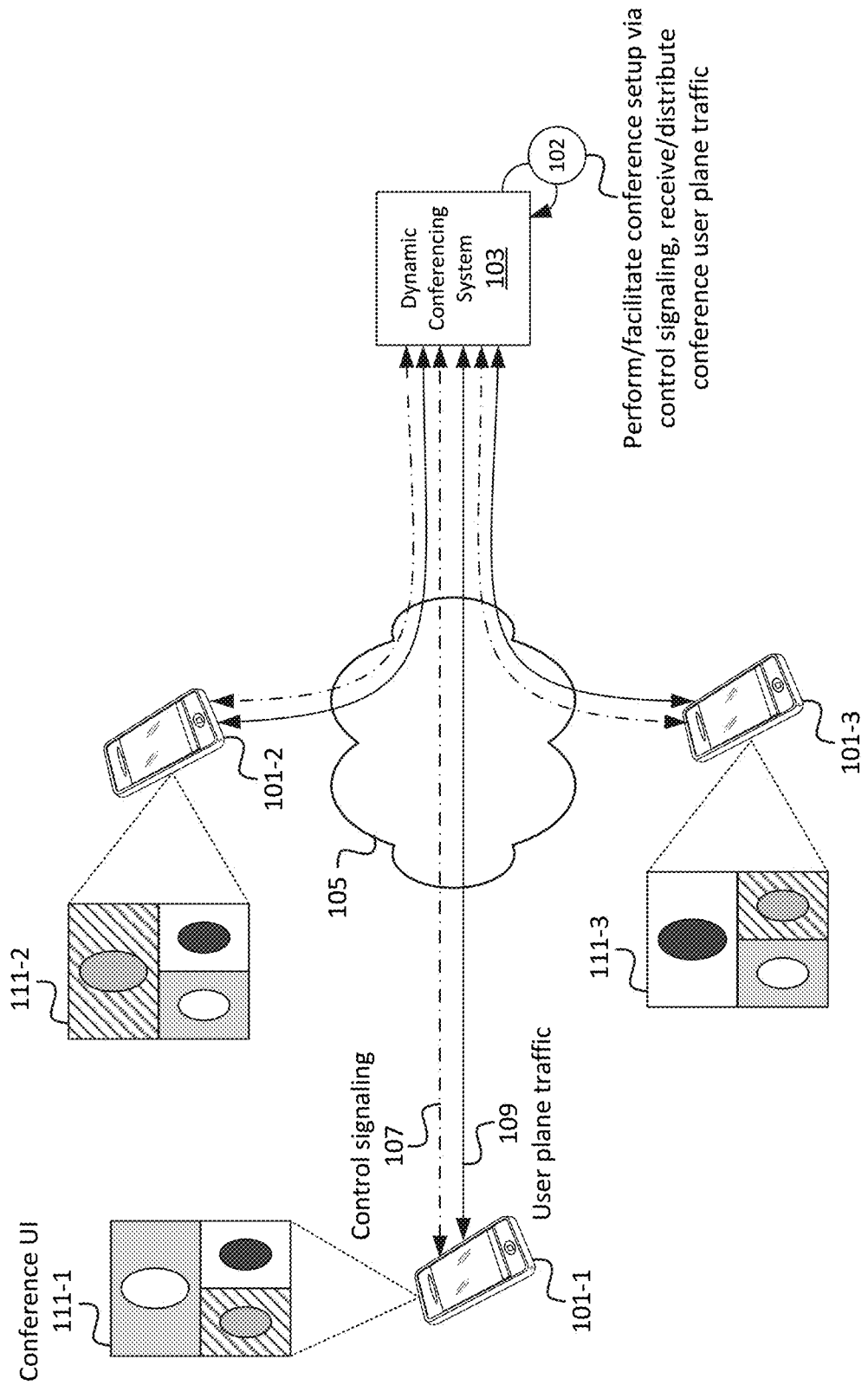
FIGS. 1 and 2 illustrate an example overview of one or more embodiments described herein.

The following detailed description refers to the accompanying drawings. The same reference numbers in different drawings may identify the same or similar elements.

Embodiments described herein provide for the dynamic adjustment and/or enhancement of traffic associated with voice calls, audiovisual conferences, and/or other types of communication sessions (referred to herein as "conferences" for the sake of brevity), in situations where a network connection of one or more conference participants exhibits issues that may affect audio and/or video quality. As discussed herein, the adjustment and/or enhancement may include the determination of degraded network conditions at a particular conference participant (e.g., a particular User Equipment ("UE")), the generation of condensed conference information, and the transmission of the condensed conference information to a Dynamic Conferencing System ("DCS") of some embodiments. The condensed conference information may be transmitted in lieu of "full" conference information, such as audio and/or video. The condensed conference information may include, for example, a text transcription of speech received at the UE (e.g., as uttered by a user of the UE), and may thus consume less network bandwidth than audio and/or video data that may be captured by the UE and provided to other conference participants under "normal" network conditions (e.g., when the network conditions have not degraded to below a threshold quality).

In some embodiments, the condensed conference information may be encoded in, or otherwise included in, control signaling associated with the conference. Control signaling may, in some embodiments, be associated with a higher priority communication channel than user plane traffic, such as audio data, video data, etc. associated with the conference. As such, the condensed conference information may be communicated using high priority Quality of Service ("QoS") parameters, to ensure low-latency handling of such information. As further described below, the condensed conference information may be used to generate reconstructed and/or extrapolated conference information, to simulate the speech and/or video of a user of the UE, to minimize disruptions that may be otherwise caused by network issues that affect connection associated with the UE. For example, the DCS of some embodiments may generate and/or utilize one or more models associated with the UE and/or a user of the UE to generate or simulate speech and/or video of the user based on the condensed conference information, in order to further enhance the simulated speech and/or video of the user. In some embodiments, the DCS may be implemented by a Multi-Access/Mobile Edge Computing ("MEC") device, referred to sometimes herein simply as a "MEC," which may include relatively robust processing resources at an edge of a network, thus further enhancing the speed at which the reconstructed and/or extrapolated conference information may be generated. As such, the reconstructed and/or enhanced conference information may be provided to other participants in real time or near-real time, thus minimizing disruptions to the conference.

As shown in FIG. 1, for example, a set of UEs 101-1, 101-2, and 101-3 (sometimes referred to herein individually as "UE 101" or collectively as "UEs 101") may participate in an audiovisual conference, in which video data (e.g., depicting users' faces) and audio data (e.g., including users' speech) may be received from and distributed to UEs 101. For example, UEs 101 may communicate with DCS 103 via network 105, in order to send and/or receive control signaling 107 and/or user plane traffic 109 associated with the conference.

DCS 103 may be, may include, and/or may be implemented by one or more devices or systems, such as a web server, an application server, and/or some other type of network-accessible resource. In some embodiments, DCS 103 may be, may include, and/or may be implemented by a MEC that is deployed at a network edge, such as at or communicatively coupled to a base station of a radio access network ("RAN") of a wireless network. In some embodiments, some functions of DCS 103 may be performed by a cloud-based device or system that is accessible via the Internet or one or more other networks, while other functions of DCS 103 may be performed by a MEC or other type of edge resource that is accessible via a RAN of a wireless network.

Control signaling 107 may include messages such as conference setup messages, messages related conference features (e.g., hold, add participant, block participant, mute participant, etc.), and/or other types of control messages. In some embodiments, control signaling 107 may include Session Initiation Protocol ("SIP") messages and/or messages associated with some other suitable protocol. In some embodiments, user plane traffic 109 may include video traffic, audio traffic, and/or other types of traffic associated with the conference. In some embodiments, control signaling 107 and user plane traffic 109 may be associated with different QoS parameters. For example, control signaling 107 may, in some embodiments, be associated with a higher QoS level than user plane traffic 109. In some embodiments, control signaling 107 may be associated with a QoS level that allows or guarantees a lower maximum throughput than user plane traffic 109. For example, while user plane traffic 109 may be associated with a relatively high maximum or guaranteed throughput to allow for video traffic, audio traffic, or other types of traffic that may consume a relatively high amount of bandwidth, control signaling 107 may be associated with a relatively low maximum or guaranteed throughput to allow for text-based communications such as protocol messages, keep-alive or "heartbeat" messages, commands, metadata, etc. In some embodiments, control signaling 107 may be communicated between respective UEs 101 and DCS 103 via one or more control plane communication channels, and user plane traffic 109 may be communicated between respective UEs 101 and DCS 103 via one or more user plane communication channels.

Based on control signaling 107 from one or more UEs 101, DCS 103 may perform and/or otherwise facilitate (at 102) a setup of a conference between UEs 101-1, 101-2, and 101-3. For example, a particular UE 101 may communicate (e.g., via control signaling 107) with DCS 103 to initiate the conference, and other UEs 101 may communicate with DCS 103 (e.g., via control signaling 107) to join the conference. UEs 101 may further communicate with DCS 103 (e.g., via user plane traffic 109) to send and/or receive conference user plane traffic, such as audio and/or video. For example, a user of UE 101-1 may speak into an audio input device associated with UE 101-1, such as a microphone, headset, or the like, and UE 101-1 may provide (e.g., via user plane traffic 109) captured audio information, such as encoded audio information based on the user's speech, to DCS 103 for distribution to UEs 101-2 and 101-3. Similarly, a camera of UE 101-1 may capture video information, such as the user's face, and UE 101-1 may provide (e.g., via user plane traffic 109) the captured video information to DCS 103 for distribution to UEs 101-2 and 101-3.

UEs may each present a respective conference user interface ("UI") 111 via a display screen, speaker, etc. For example, UE 101-1 may present conference UI 111-1, UE 101-2 may present conference UI 111-2, and UE 101-3 may present conference UI 111-3. Each respective conference UI 111 may present video information, such as captured video from some or all UEs 101 involved in the conference. Each respective conference UI 111 may present audio information, such as captured audio from some or all UEs 101 involved in the conference.

Figure 2:
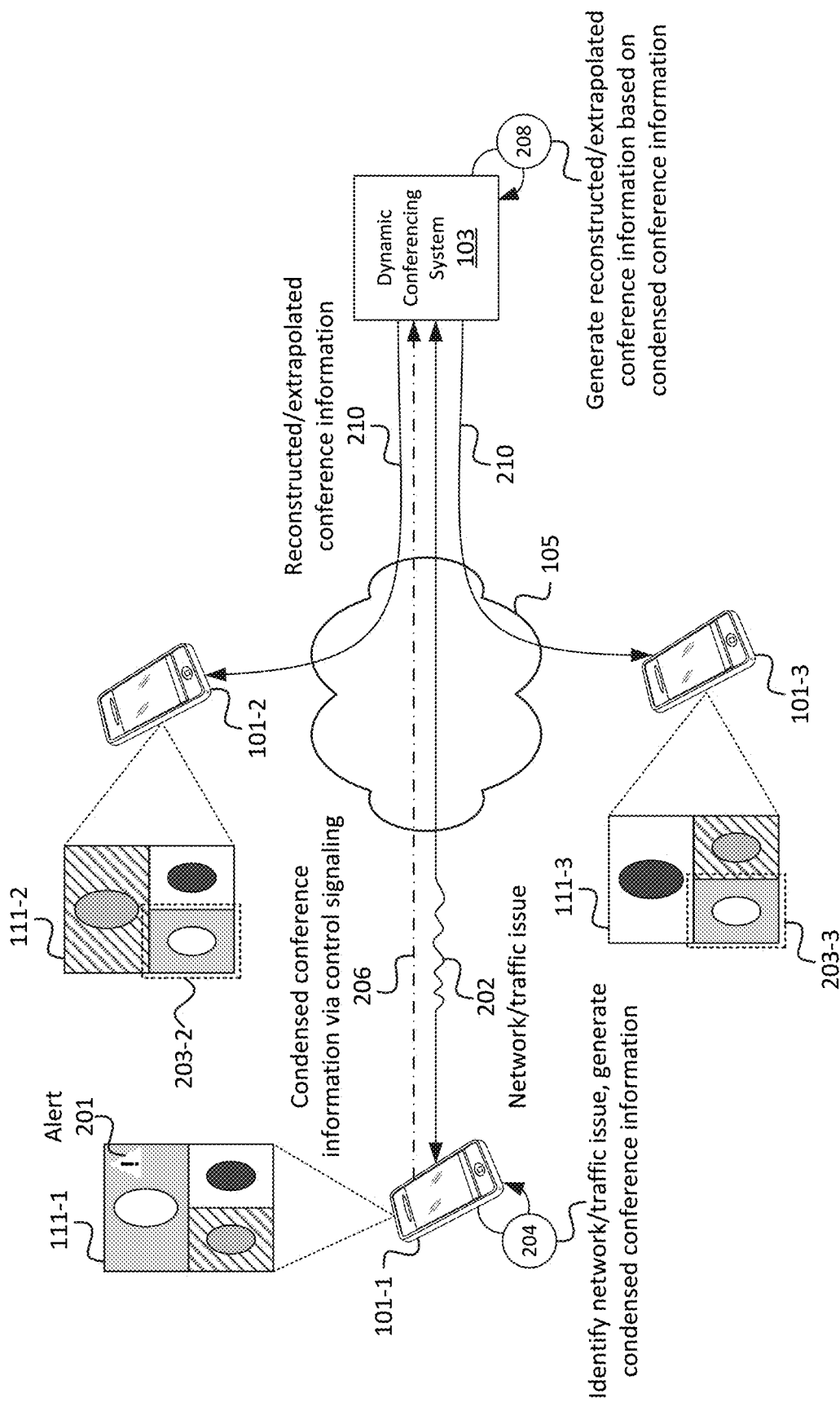

Situations may arise where one or more UEs 101 experience degraded network conditions that may affect the quality of the conference. For example, as shown in FIG. 2, a network and/or traffic issue 202 may affect the quality of the conference with respect to UE 101-1. Network and/or traffic issue 202 may include, for example, degraded wireless communications between UE 101-1 and a base station of a RAN of a wireless network, degraded wireless communications between UE 101-1 and a WiFi access point, network congestion associated with a base station or access point to which UE 101-1 is connected, and/or other issues that affect the ability of UE 101-1 to output conference information (e.g., user plane traffic such as audio and/or video) to DCS 103 via network 105.

UE 101-1 may identify (at 204) the network and/or traffic issue by determining that a network throughput associated with communications between UE 101-1 and DCS 103 is below a threshold throughput, by determining that latency of communications between UE 101-1 and DCS 103 is above a threshold latency, by determining that a quantity of acknowledgement messages from DCS 103 over a given time period is below a threshold quantity, by determining that a wireless signal strength or quality between UE 101-1 and a base station or access point is below a threshold signal strength or quality, and/or using some other suitable manner of detecting network and/or traffic issue 202. In some embodiments, DCS 103 and/or some other device or system may detect network and/or traffic issue 202, and notify UE 101-1 of the existence of network and/or traffic issue 202. In some embodiments, UE 101-1 may present (e.g., via conference UI 111-1) an alert, such as visual alert 201 and/or an audible alert, indicating that network and/or traffic issue 202 has been identified.

Based on detecting network and/or traffic issue 202 (e.g., in a manner discussed above or some other suitable manner), UE 101-1 may generate condensed conference information based on audio and/or video information captured by UE 101-1. For example, UE 101-1 may, after identifying network and/or traffic issue 202, commence generating a transcript of audio data captured by an audio input device of UE 101-1. For example, UE 101-1 may use speech-to-text techniques to generate the transcript. In some embodiments, UE 101-1 may further condense the transcript, such as by removing vowels, encoding words and/or phrases into a reduced set of characters, and/or may perform other operations to further condense the transcript.

In some embodiments, UE 101-1 may generate a text-based description or set of annotations based on video information captured by a camera associated with UE 101-1. In some embodiments, UE 101-1 may utilize image recognition techniques, feature extraction techniques, and/or other suitable techniques to identify or classify video information captured by the camera of UE 101-1. For example, UE 101-1 may identify that a user of UE 101-1 has nodded his or her head, is smiling, has stepped out of frame, and/or has performed other actions, and may generate condensed conference information indicating such identified actions.

In some embodiments, the condensed conference information may include animatronic control information for an animated simulation of the user or the user's face. For example, the animatronic control information may include indications of reference points of the user's face (e.g., the tip of the user's nose, the user's eyes, the user's chin, etc.), as well as movement information (e.g., position, roll, pitch, yaw, etc.) associated with the reference points. In this manner, DCS 103 may be able to generate (e.g., at 208, as discussed below) a detailed simulation or recreation of the user's face.

While some examples of condensed conference information are described above, in some embodiments, UE 101-1 may generate other types of condensed conference information based on image, video, and/or other information captured or sensed by UE 101-1. For example, animatronic control information is discussed above in the context of a user's face. In practice, animatronic control information may be generated and/or used for other objects depicted in video captured by UE 101-1. Further, other types of control information or annotations may be generated, such as control information or annotations regarding the user's speech, voice, etc. For instance, such control information may include indications of head movement, facial expressions, or the like. In one example, an annotation such as "cough" may cause DCS 103 to generate (e.g., at 208, as discussed below) an animation of the user coughing, and/or may generate a coughing sound as part of reconstructed and/or extrapolated conference information.

In some embodiments, UE 101-1 may generate the condensed conference information when no network and/or traffic issue 202 is present, and may discard or otherwise not use the condensed conference information in situations where no network and/or traffic issue 202 is present. In some embodiments, transcripts and/or other information that may be used as condensed conference information may be used by UE 101-1 and/or some other device or system to generate or modify a model associated with UE 101-1 and/or a user of UE 101-1, such as a model that identifies speech patterns or other attributes of the user of UE 101-1 and/or of UE 101-1 itself. Such model may be used when generating reconstructed and/or extrapolated conference information, as described below.

UE 101-1 may provide (at 206) the condensed conference information to DCS 103. For example, UE 101-1 may provide such condensed conference information on a periodic basis, an intermittent basis, an event-driven basis, and/or on some other ongoing basis. For example, UE 101-1 may provide the condensed conference information every 3 seconds, every second, multiple times a second, and/or some other periodic or intermittent basis. In some embodiments, UE 101-1 may provide the condensed conference information when detecting that a user of UE 101-1 has spoken a complete sentence, phrase, or word. In some embodiments, UE 101-1 may provide the condensed conference information when detecting that a user of UE 101-1 has moved his or her head and/or has changed his or her facial expression. In this manner, DCS 103 may receive the condensed conference information in real time or near-real time, and may further receive the condensed conference information at times that correspond to audible or visual cues associated with the user. In some embodiments, UE 101-1 may provide an indication to DCS 103 of the existence of network and/or traffic issue 202, based on which DCS 103 may determine that UE 101-1 will be sending condensed conference information, and/or which may trigger a generation (e.g., at 208, as discussed below) of reconstructed and/or extrapolated conference information based on the condensed conference information.

In some embodiments, the condensed conference information may be provided via control signaling 107. For example, UE 101-1 may, based on identifying (at 204) network and/or traffic issue 202, and/or based on generating (at 204) the condensed conference information, provide (at 206) the condensed conference information via SIP messages (e.g., SIP REINVITE and/or other SIP messages), keep-alive or "heartbeat" messages, null control messages, and/or other control signaling 107. As noted above, control signaling 107 may be associated with QoS parameters and/or channels that receive QoS treatment that is different from user plane traffic 109. Such QoS treatment may include prioritizing control signaling 107 over user plane traffic 109, and/or guaranteeing or attempting to achieve (e.g., by network elements of network 105 and/or one or more other networks) less than a threshold latency for control signaling 107.

DCS 103 may generate (at 208) reconstructed and/or extrapolated conference information based on the received (at 206) condensed conference information. For example, DCS 103 may utilize text-to-speech techniques to generate or simulate audible speech based on a text transcript of speech of a user of UE 101-1. Additionally, or alternatively, DCS 103 may utilize animation techniques or other suitable techniques to generate or simulate movements, facial expressions, or the like on a video simulation or animation of the user of UE 101-1, based on a text description or encoded information (e.g., as included in the condensed conference information) indicating such movements, facial expressions, etc.). In some embodiments, a text description or annotations indicating detected movements, facial expressions, or the like may be provided to other conference participants in addition to, or in lieu of, animations depicting such movements, facial expressions, or the like.

In some embodiments, DCS 103 may utilize a generic voice and/or simulated face or head for the user. In some embodiments, DCS 103 may utilize one or more models based on the user's voice, face, actions, etc. to generate custom-tailored reconstructed and/or extrapolated conference information, based on particular attributes of the user. In this manner, different users may be simulated differently, and more closely to how such users actually sound and behave.

Figure 3:
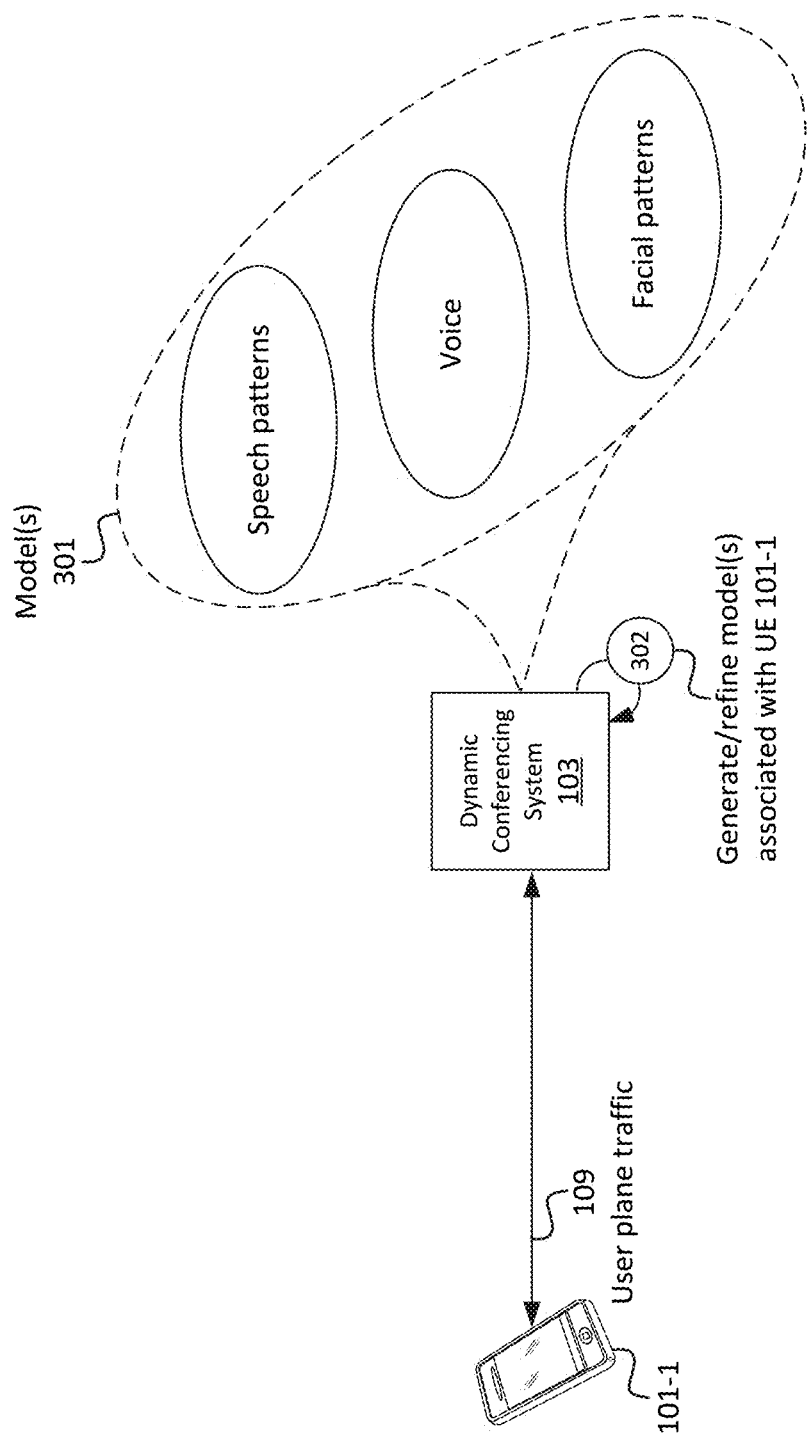
FIGS. 3 and 4 illustrate an example of generating and using models to generate reconstructed and/or extrapolated conference information based on condensed conference information, in accordance with some embodiments.

For example, as shown in FIG. 3, DCS 103 may generate and/or refine (at 302) a set of models 301 associated with UE 101-1, based on user plane traffic 109 sent to and/or received from UE 101-1. For example, UE 101-1 may send and/or receive user plane traffic 109 in connection with participating in conferences with other UEs 101. Over time, DCS 103 may generate and/or refine models 301 based on audio information, video information, text information, and/or other information received from UE 101-1 and/or one or more other sources that generate or provide information associated with UE 101-1. In some embodiments, DCS 103 may utilize artificial intelligence/machine learning ("AI/ML") techniques or other suitable techniques in order to generate and/or refine the models, and/or to analyze user plane traffic (e.g., audio and/or video data) to identify attributes or features of such traffic.

While this example is provided in the context of UE 101-1, similar concepts may apply other UEs 101 and/or other types of devices. Further, in some embodiments, models 301 may be generated and refined on a per-user basis, such that different users using the same UE 101 may be associated with different sets of models 301.

Models 301 may include, for example, speech pattern models, voice models, facial pattern models, and/or other suitable models. Speech pattern models may indicate, for example, diction, audible mannerisms, talking speed, and/or other attributes of the content of a user's speech. Voice models may indicate, for example, pitch, tonality, loudness, and/or attributes of the form or sound of a user's speech. Facial pattern models may indicate, for example, facial expressions of a user, head movements of the user, and/or other attributes of how a user is visually depicted.

In some embodiments, DCS 103 may maintain correlation and/or affinity information between different models 301. For example, DCS 103 may maintain information associating particular speech pattern models with particular voice models and/or facial pattern models. For instance, a DCS 103 may maintain information indicating that when the user says the word "Wow," the pitch of the user's voice typically increases, the loudness of the user's voice typically increases, and the user's eyebrows are typically raised. In the preceding example, the term "typically" is used to reflect an analysis that indicates that an affinity or correlation between these example occurrences exceeds a threshold affinity or correlation.

Figure 4:
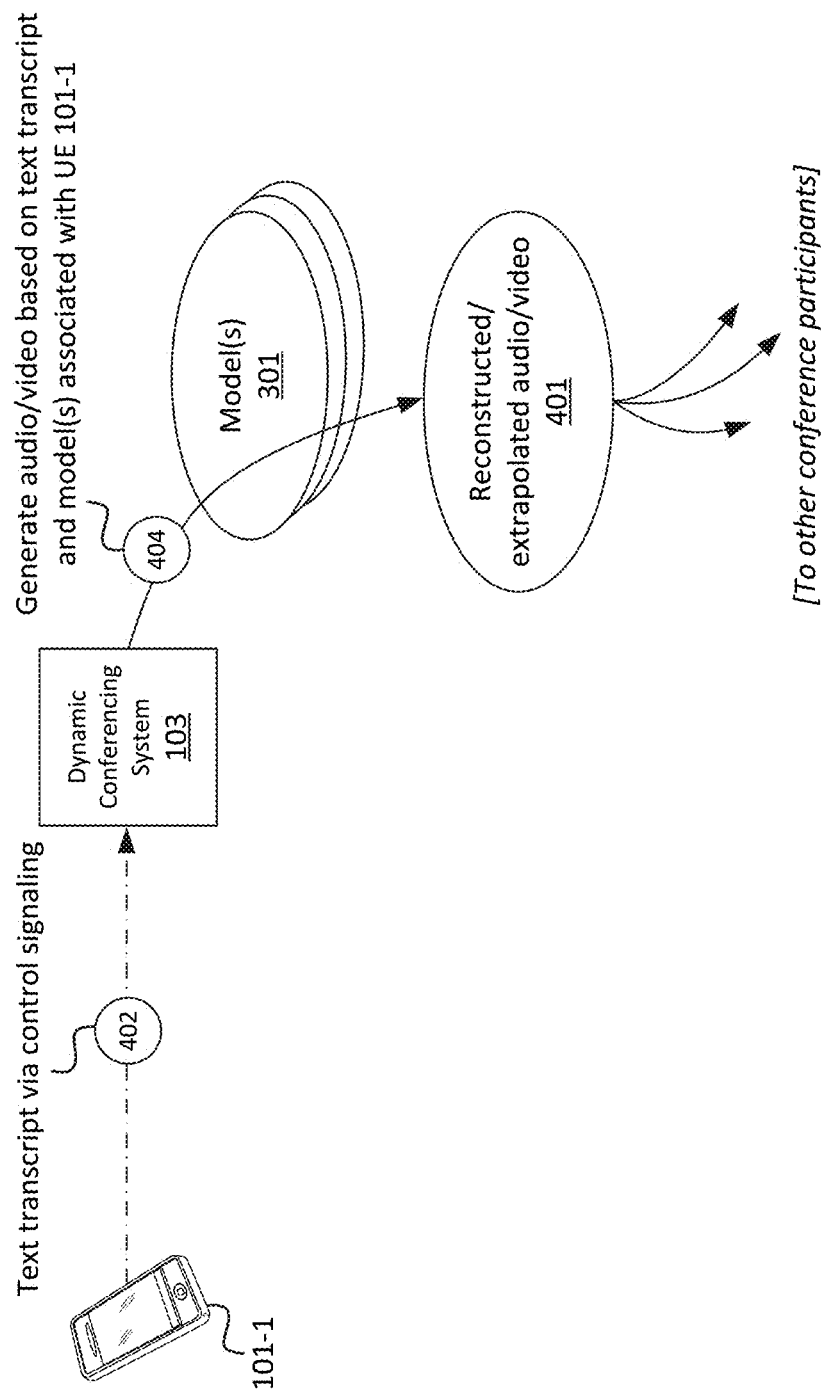

As noted above, such models 301 may be used by DCS 103 when generating (at 208) reconstructed and/or extrapolated conference information based on condensed conference information received from a given UE 101. For example, as shown in FIG. 4, DCS 103 may receive (at 402) a text transcript of speech captured at UE 101-1. As similarly discussed above, such text transcript may be received via a control channel (e.g., via control signaling 107), based on an identification by UE 101-1 of degraded network conditions during a conference with one or more other UEs 101. While this example is provided in the context of a text transcript of speech captured at UE 101-1, similar concepts may apply to other types of condensed conference information discussed above.

DCS 103 may generate (at 404) reconstructed and/or extrapolated audio and/or video 401 based on the text transcript and models 301 associated with UE 101-1, and/or associated with the user of UE 101-1. For example, DCS 103 may generate or simulate audible speech based on words or phrases encoded in or otherwise included in the text transcript and further based on speech models, voice models, or the like associated with UE 101-1 and/or the user. In some embodiments, DCS 103 may generate or simulate an image of the user, and may further generate or simulate movements, facial expressions, etc. associated with the user based on information included in the transcript and further based on facial pattern models or other suitable models 301 associated with the user.

As noted above, some or all of the functionality associated with DCS 103 may be implemented by an edge computing facility, such as a MEC that is deployed at or proximate to a base station of a RAN. Such edge computing facilities may communicate with UEs 101 via relatively low-latency communications, and may further include powerful processing capabilities, which may enable reconstructed and/or extrapolated audio and/or video 401 to be generated in real time or near-real time, relative to when UE 101-1 captures audio and/or video information based on which reconstructed and/or extrapolated audio and/or video 401 is generated. DCS 103 may further distribute reconstructed and/or extrapolated audio and/or video 401 to one or more other conference participants (e.g., UEs 101), thus providing conference services in a seamless, uninterrupted manner, even in situations where UE 101-1 experiences network issues that would otherwise disrupt the conference.

In some embodiments, one or more of the operations described above with respect to DCS 103 may be performed by one or more UEs 101, such as participants in a conference with a particular UE 101 from which condensed conference information is received. For example, DCS 103 may provide condensed conference information to one or more UEs 101, which may themselves generate reconstructed and/or extrapolated conference information based on the condensed conference information.

Returning to FIG. 2, DCS 103 may provide (at 210) reconstructed and/or extrapolated conference information (e.g., reconstructed and/or extrapolated audio and/or video 401) to UEs 101-2 and 101-3. UEs 101-2 and 101-3 may present, via conference UIs 111-2 and 111-3, respectively, some or all of the reconstructed and/or extrapolated conference information associated with UE 101-1. For example, conference UIs 111-2 and 111-3 may include display areas 203-2 and 203-3, respectively, depicting a simulated and/or generated face and/or voice of a user of UE 101-1, where such face and/or voice of the user may be included in or based on the reconstructed and/or extrapolated conference information provided (at 210) to UEs 101-2 and 101-3.

Figure 5:
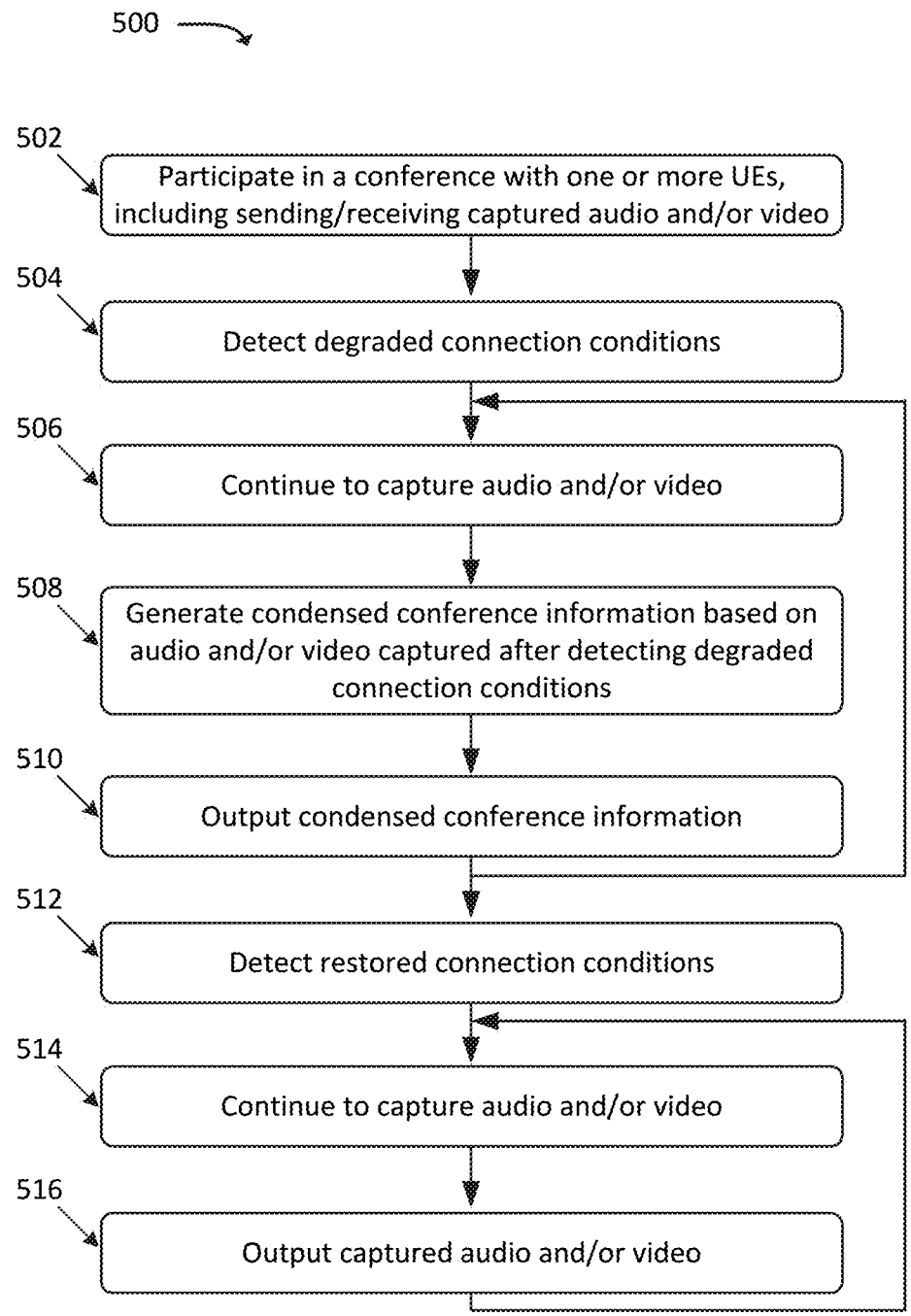
FIG. 5 illustrates an example process for generating and providing condensed conference information based on the detection of degraded network conditions, in accordance with some embodiments.

FIG. 5 illustrates an example process 500 for generating and providing condensed conference information based on the detection of degraded network conditions. In some embodiments, some or all of process 500 may be performed by UE 101. In some embodiments, one or more other devices may perform some or all of process 500 in concert with or in lieu of UE 101, such as DCS 103.

As shown, process 500 may include participating (at 502) in a conference with one or more UEs 101. For example, as discussed above, a set of UEs 101 may participate in an audio and/or video conference, which may include providing, sending, etc. audio and/or video traffic (e.g., user plane traffic 109) to DCS 103 and/or some other device or system that facilitates audio and/or video conferencing. Participating in the audio and/or video conference may further include receiving audio and/or video traffic (e.g., user plane traffic 109) from DCS 103 and/or some other device or system that facilitates audio and/or video conferencing. The audio and/or video traffic provided by each UE 101 may include audio and/or video that has been captured at each respective UE 101 via a microphone, camera, headset, or other suitable device.

Process 500 may further include detecting (at 504) degraded network conditions. For example, UE 101 may detect, via a speed test, a connection test, and/or some other sort of suitable technique, that network conditions between UE 101 and one or more networks 105 to which UE 101 is connected (e.g., via which UE 101 communicates with DCS 103) have degraded below a threshold level. For example, UE 101 may identify that throughput of traffic from UE 101 via network 105 has fallen below a threshold throughput, that latency of traffic from UE 101 via network 105 has risen above a threshold latency, and/or that network conditions have otherwise degraded, to the extent that the transmission of captured audio and/or video from UE 101 via network 105 may potentially be negatively impacted. As noted above, UE 101 may detect the degraded network conditions, and/or some other device or system may detect the degraded network conditions and indicate such detection to UE 101.

Process 500 may additionally include continuing (at 506) to capture audio and/or video. For example, UE 101 that is experiencing the degraded network conditions may continue to capture audio and/or video via a microphone, camera, headset, etc. after the detection of the degraded network conditions.

Process 500 may also include generating (at 508) condensed conference information based on the audio and/or video captured after the detection of the degraded network conditions. As discussed above, the condensed conference information may include a text transcript of captured audio, animatronic control instructions based on captured video information, annotations, and/or other suitable condensed conference information.

In this sense, the audio and/or video captured and/or sent (at 502) prior to detecting (at 504) degraded network conditions may be considered as first audio and/or video, and the captured audio and/or video based on which the condensed conference information is generated (at 508) may be considered as second audio and/or video. That is, block 502 may include the sending of first audio and/or video captured at UE 101, and block 508 may include the generation of condensed conference information based on second audio and/or video captured at UE 101.

Process 500 may further include outputting (at 510) the condensed conference information. For example, UE 101 may provide, output, etc. the condensed conference information to DCS 103. In some embodiments, UE 101 may provide, output, etc. the condensed conference information with different QoS parameters than audio and/or video that is sent (at 502) as part of the conference. For example, UE 101 may output the condensed conference information as, or include condensed conference information in, control signaling 107 and/or via one or more control plane channels. In some embodiments, the condensed conference information may be included as an information element in one or more control messages.

As discussed above, DCS 103 may generate reconstructed and/or extrapolated conference information based on the condensed conference information. For example, as discussed above, DCS 103 may generate audio based on a text transcript included in the condensed conference information, video based on animatronic instructions, etc. As also discussed above, DCS 103 may generate and/or maintain one or more models associated with UE 101 and/or a user of UE 101, which may be used to generate custom-tailored reconstructed and/or extrapolated conference information. For example, different UEs 101 and/or users may be associated with different speech patterns, voices, mannerisms, movements, etc., which may be reflected by the reconstructed and/or extrapolated conference information generated based on the condensed conference information and particular models associated with such different UEs 101 and/or users.

As similarly noted above, blocks 506-510 may performed or repeated iteratively, such that condensed conference information may be provided in real time or near-real time, and further such that reconstructed and/or extrapolated conference information may be generated in real time or near-real time and provided to other conference participant UEs 101.

Process 500 may additionally include detecting (at 512) restored connection conditions. For example, UE 101 may identify that throughput of traffic from UE 101 via network 105 has risen above (or returned to) a threshold throughput, that latency of traffic from UE 101 via network 105 has fallen below (or returned to) a threshold latency, and/or that network conditions have otherwise improved or been restored, to the extent that the transmission of captured audio and/or video from UE 101 via network 105 is not likely to be negatively impacted. As noted above, UE 101 may detect the restored network conditions, and/or some other device or system may detect the restored network conditions and indicate such detection to UE 101.

Process 500 may also include continuing (at 514) to capture audio and/or video at UE 101, and outputting (at 516) the captured audio and/or video. For example, based on the restored network connection conditions, UE 101 may provide, output, etc. the captured audio and/or video as user plane traffic 109, which may be distributed to one or more other UEs 101 that are participants in the conference. In this manner, condensed conference information (e.g., not including captured video and/or audio information) may be sent by UE 101 when network conditions are below a threshold level, while full video and/or audio information may be sent by UE 101 when network conditions are at or above the threshold level.

Figure 6:
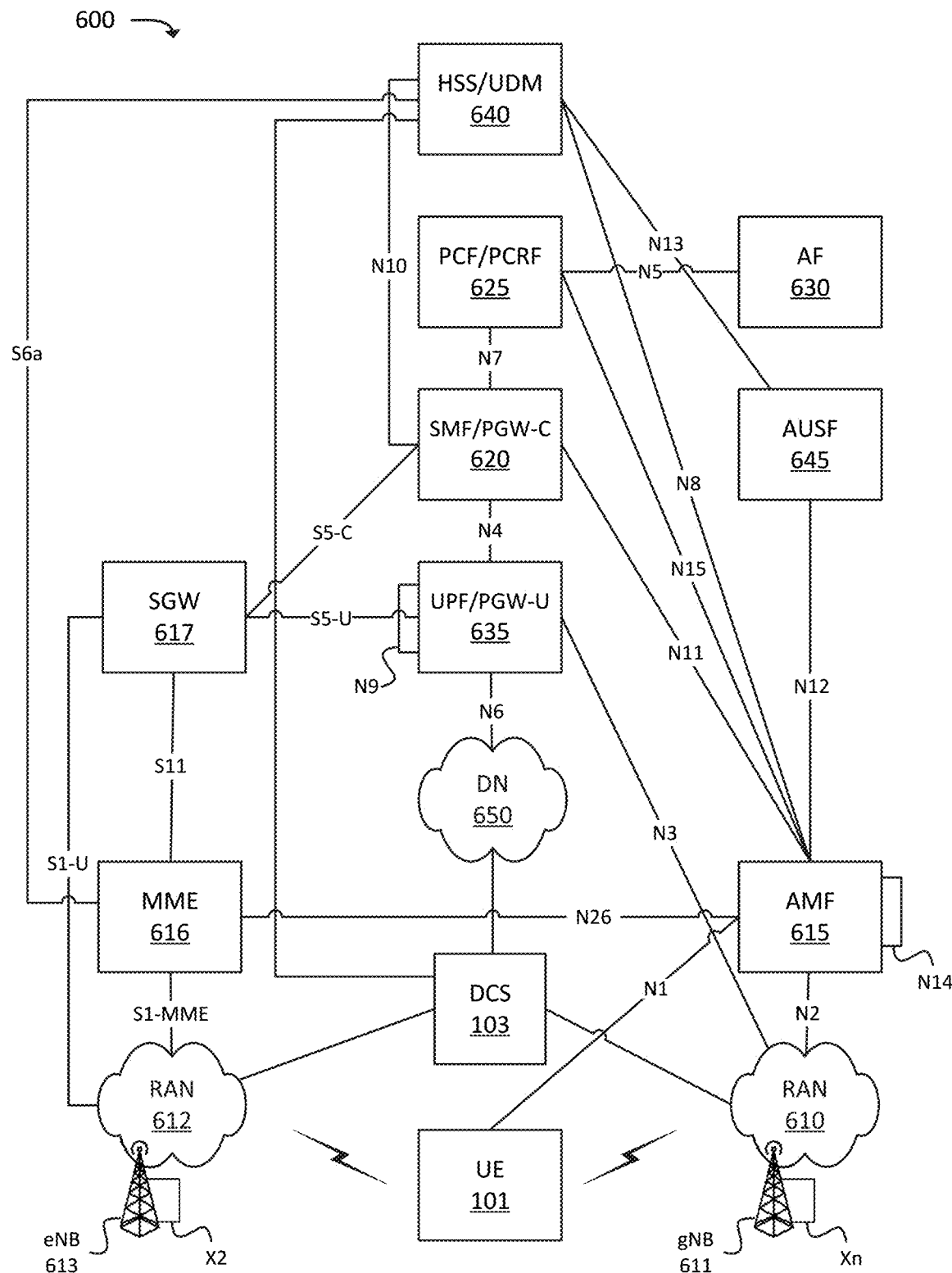
FIG. 6 illustrates an example environment in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 600 may include UE 101, RAN 610 (which may include one or more Next Generation Node Bs ("gNBs") 611), RAN 612 (which may include one or more one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650, RAN 610, and/or RAN 612), such as DCS 103, which may perform one or more operations described above.

The example shown in FIG. 6 illustrates one instance of each network component or function (e.g., one instance of SMF/PGW-C 620, PCF/PCRF 625, UPF/PGW-U 635, HSS/UDM 640, and/or AUSF 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or AUSF 645, while another slice may include a second instance of SMF/PGW-C 620, PCF/PCRF 625, UPF/PGW-U 635, HSS/UDM 640, and/or AUSF 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 101 may include a computation and communication device, such as a wireless mobile communication device that is capable of communicating with RAN 610, RAN 612, and/or DN 650. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 101 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 101 may communicate with one or more other elements of environment 600. UE 101 may communicate with RAN 610 via an air interface (e.g., as provided by gNB 611). For instance, RAN 610 may receive traffic (e.g., voice call traffic, data traffic, messaging traffic, signaling traffic, etc.) from UE 101 via the air interface, and may communicate the traffic to UPF/PGW-U 635, and/or one or more other devices or networks. Similarly, RAN 610 may receive traffic intended for UE 101 (e.g., from UPF/PGW-U 635, AMF 615, and/or one or more other devices or networks) and may communicate the traffic to UE 101 via the air interface.

RAN 612 may be, or may include, a LTE RAN that includes one or more base stations (e.g., one or more eNBs 613), via which UE 101 may communicate with one or more other elements of environment 600. UE 101 may communicate with RAN 612 via an air interface (e.g., as provided by eNB 613). For instance, RAN 610 may receive traffic (e.g., voice call traffic, data traffic, messaging traffic, signaling traffic, etc.) from UE 101 via the air interface, and may communicate the traffic to UPF/PGW-U 635, and/or one or more other devices or networks. Similarly, RAN 610 may receive traffic intended for UE 101 (e.g., from UPF/PGW-U 635, SGW 617, and/or one or more other devices or networks) and may communicate the traffic to UE 101 via the air interface.

AMF 615 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 612 and/or eNB s 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate the establishment of communication sessions on behalf of UE 101. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 101, from DN 650, and may forward the user plane data toward UE 101 (e.g., via RAN 610, SMF/PGW-C 620, and/or one or more other devices). In some embodiments, multiple UPFs 635 may be deployed (e.g., in different geographical locations), and the delivery of content to UE 101 may be coordinated via the N9 interface (e.g., as denoted in FIG. 6 by the line marked "N9" originating and terminating at UPF/PGW-U 635). Similarly, UPF/PGW-U 635 may receive traffic from UE 101 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 101.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 101 may communicate, through DN 650, with data servers, other UEs 101, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 101 may communicate.

Figure 7:
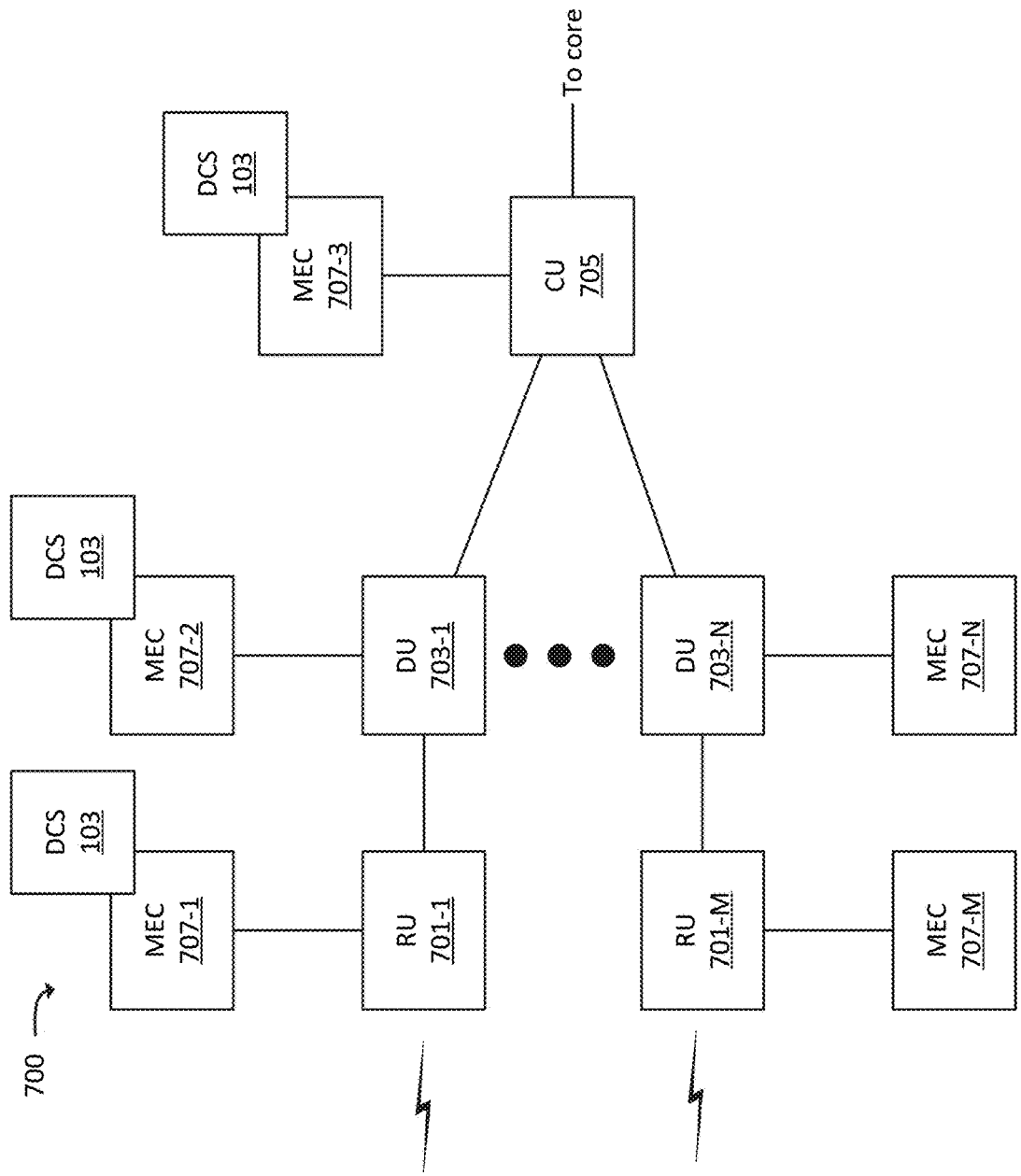
FIG. 7 illustrates an example arrangement of a radio access network ("RAN"), in accordance with some embodiments.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 101 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 101, and may determine which DU(s) 703 should receive the downlink traffic. DU 703 may include one or more devices that transmit traffic between a core network (e.g., via CU 705) and UE 101 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 101.

RU 701 may include hardware circuitry (e.g., one or more RF transceivers, antennas, radios, and/or other suitable hardware) to communicate wirelessly (e.g., via an RF interface) with one or more UEs 101, one or more other DUs 703 (e.g., via RUs 701 associated with DUs 703), and/or any other suitable type of device. In the uplink direction, RU 701 may receive traffic from UE 101 and/or another DU 703 via the RF interface and may provide the traffic to DU 703. In the downlink direction, RU 701 may receive traffic from DU 703, and may provide the traffic to UE 101 and/or another DU 703.

RUs 701 may, in some embodiments, be communicatively coupled to one or more MECs 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 101, via a respective RU 701.

For example, RU 701-1 may route some traffic, from UE 101, to MEC 707-1 instead of to a core network (e.g., via DU 703 and CU 705). MEC 707-1 may process the traffic, perform one or more computations based on the received traffic, and may provide traffic to UE 101 via RU 701-1. In this manner, ultra-low latency services may be provided to UE 101, as traffic does not need to traverse DU 703, CU 705, and an intervening backhaul network between DU network 700 and the core network. In some embodiments, one or more MECs 707 may include, and/or may implement, some or all of the functionality described above with respect to DCS 103.

Figure 8:
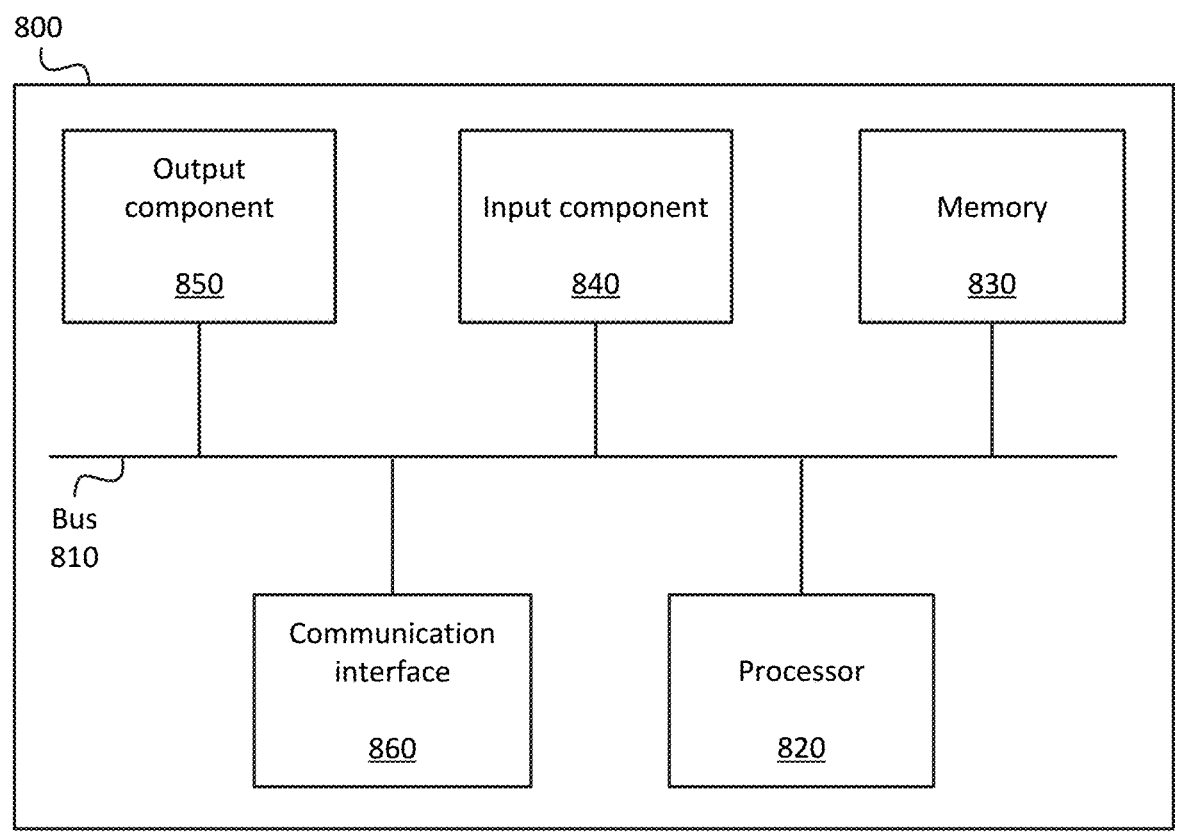
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. In some embodiments, processor 820 may be or may include one or more hardware processors. Memory 830 may include any type of dynamic storage device that may store information and instructions for execution by processor 820, and/or any type of non-volatile storage device that may store information for use by processor 820.

Input component 840 may include a mechanism that permits an operator to input information to device 800 and/or other receives or detects input from a source external to 840, such as a touchpad, a touchscreen, a keyboard, a keypad, a button, a switch, a microphone or other audio input component, etc. In some embodiments, input component 840 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   capture audio or video information via one or more input devices, wherein the captured audio or video information includes video information;
   identify a condition of a connection between the device and the network;
   based on identifying the condition of the connection between the device and the network, generate condensed audio or video information based on the audio or video information captured via the one or more input devices, wherein generating the condensed audio or video information includes:
   identifying movements depicted in the captured video information; and
   generating animatronic control instructions based on the identified movements; and
   output the condensed audio or video information via the network, in lieu of outputting the captured audio or video information via the network, wherein the condensed audio or video information is received, via the network, by a Multi-Access/Mobile Edge Computing ("MEC") device associated with the network, wherein the MEC device generates an animated simulation based on the animatronic control instructions.

2. The device of claim 1, wherein the captured audio or video information is associated with a first measure of network bandwidth consumption, wherein the condensed audio or video information is associated with a second measure of network bandwidth consumption that is lower than the first measure of network bandwidth consumption.

3. The device of claim 1, wherein identifying the condition of the connection between the device and the network includes determining that a measure of bandwidth associated with the connection is less than a threshold measure of bandwidth.

4. The device of claim 1, wherein the captured audio or video information includes audio information, wherein generating the condensed audio or video information includes generating a text transcript based on the captured audio information.

5. A non-transitory computer-readable medium, storing a plurality of processor-executable instructions to:

capture audio or video information via one or more input devices associated with a particular device, wherein the captured audio or video information includes video information;

identify a condition of a connection between the particular device and the network;

based on identifying the condition of the connection between the particular device and the network, generate condensed audio or video information based on the audio or video information captured via the one or more input devices, wherein generating the condensed audio or video information includes:

identifying movements depicted in the captured video information; and generating animatronic control instructions based on the identified movements; and output the condensed audio or video information via the network, in lieu of outputting the captured audio or video information via the network, wherein the condensed audio or video information is received, via the network, by a Multi-Access/Mobile Edge Computing ("MEC") device associated with the network, wherein the MEC device generates an animated simulation based on the animatronic control instructions.

6. The non-transitory computer-readable medium of claim 5, wherein the captured audio or video information is associated with a first measure of network bandwidth consumption, wherein the condensed audio or video information is associated with a second measure of network bandwidth consumption that is lower than the first measure of network bandwidth consumption.

7. The non-transitory computer-readable medium of claim 5, wherein identifying the condition of the connection between the particular device and the network includes at least one of:

determining that a measure of bandwidth associated with the connection is less than a threshold measure of bandwidth, or determining that a measure of latency associated with the connection is greater than a threshold measure of latency.

8. The non-transitory computer-readable medium of claim 5, wherein the captured audio or video information includes audio information, wherein generating the condensed audio or video information includes generating a text transcript based on the captured audio information.

9. A method, comprising:

capturing audio or video information via one or more input devices associated with a particular device, wherein the captured audio or video information includes video information;

identifying a condition of a connection between the particular device and the network;

based on identifying the condition of the connection between the particular device and the network, generating condensed audio or video information based on the audio or video information captured via the one or more input devices, wherein generating the condensed audio or video information includes:

identifying movements depicted in the captured video information; and generating animatronic control instructions based on the identified movements; and outputting the condensed audio or video information via the network, in lieu of outputting the captured audio or video information via the network, wherein the condensed audio or video information is received, via the network, by a Multi-Access/Mobile Edge Computing ("MEC") device associated with the network, wherein the MEC device generates an animated simulation based on the animatronic control instructions.

10. The method of claim 9, wherein the captured audio or video information is associated with a first measure of network bandwidth consumption, wherein the condensed audio or video information is associated with a second measure of network bandwidth consumption that is lower than the first measure of network bandwidth consumption.

11. The method of claim 9, wherein identifying the condition of the connection between the particular device and the network includes determining that a measure of bandwidth associated with the connection is less than a threshold measure of bandwidth.

12. The method of claim 9, wherein the captured audio or video information includes audio information, wherein generating the condensed audio or video information includes generating a text transcript based on the captured audio information.

13. The method of claim 9, wherein identifying the condition of the connection between the particular device and the network includes determining that a measure of latency associated with the connection is greater than a threshold measure of latency.

14. The method of claim 9, wherein outputting the condensed audio or video information via the network includes outputting the condensed audio or video information via control plane signaling.

15. The method of claim 9, wherein the MEC device outputs the animated simulation via the network.

16. The device of claim 1, wherein identifying the condition of the connection between the particular device and the network includes determining that a measure of latency associated with the connection is greater than a threshold measure of latency.

17. The device of claim 1, wherein outputting the condensed audio or video information via the network includes outputting the condensed audio or video information via control plane signaling.

18. The device of claim 1, wherein the MEC device outputs the animated simulation via the network.

19. The non-transitory computer-readable medium of claim 5, wherein outputting the condensed audio or video information via the network includes outputting the condensed audio or video information via control plane signaling.

20. The non-transitory computer-readable medium of claim 5, wherein the MEC device outputs the animated simulation via the network.

* * * * *